Aug. 16, 1932.   L. B. WOODWORTH   1,871,938
JUNCTION BOX SYSTEM FOR ELECTRIC POWER CABLE INSTALLATIONS
Filed Jan. 12, 1929
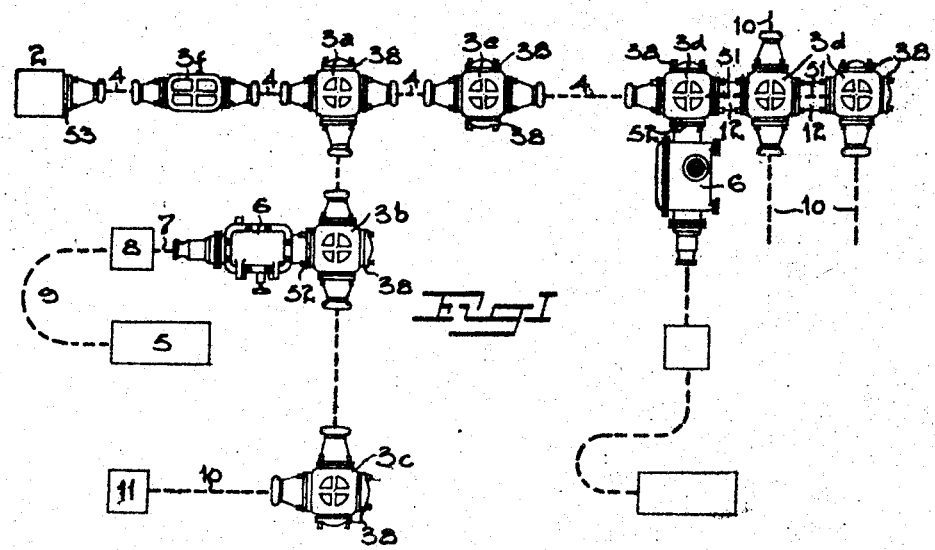
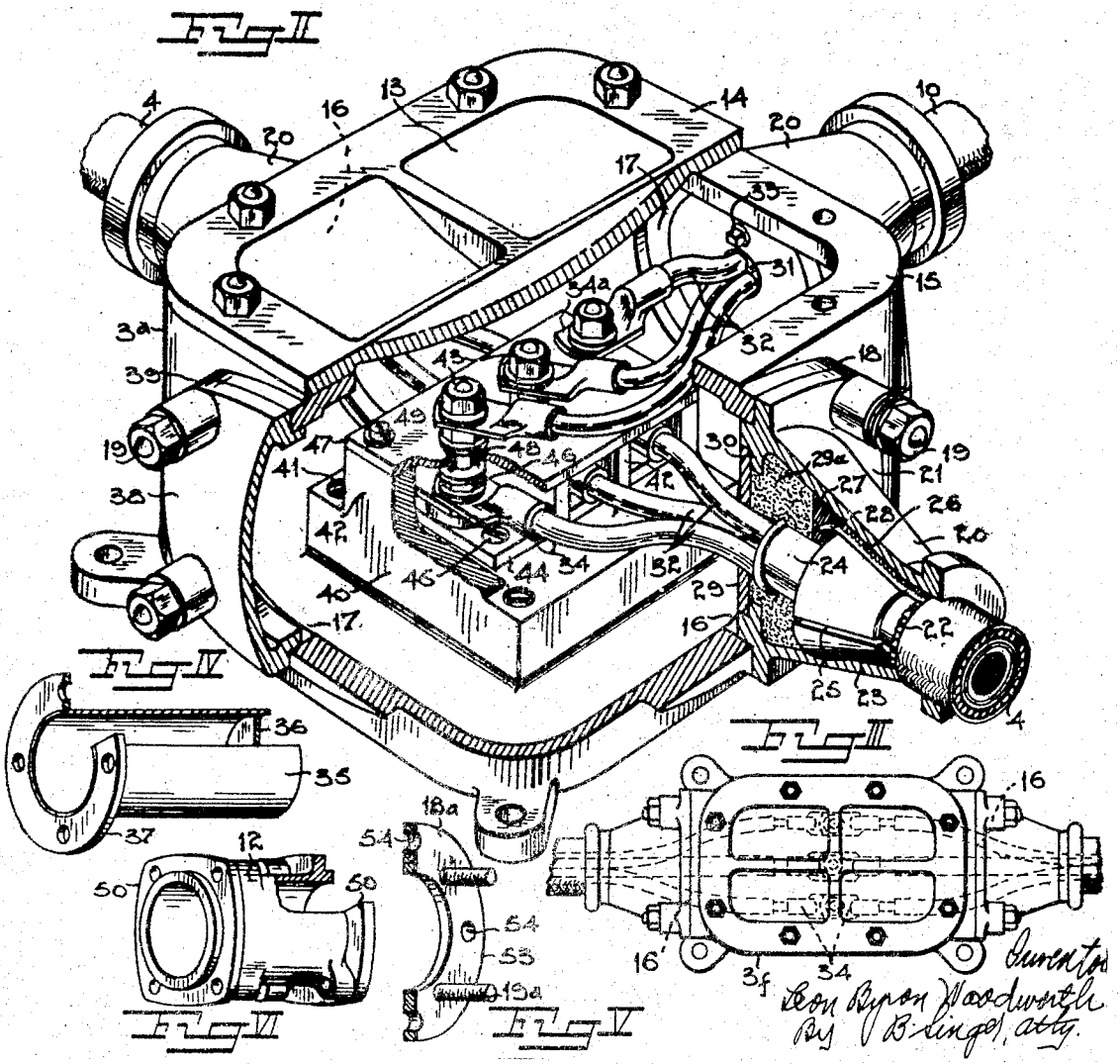

Patented Aug. 16, 1932

1,871,938

UNITED STATES PATENT OFFICE

LEON BYRON WOODWORTH, OF JOHANNESBURG, TRANSVAAL, UNION OF SOUTH AFRICA

JUNCTION BOX SYSTEM FOR ELECTRIC POWER CABLE INSTALLATIONS

Application filed January 12, 1929, Serial No. 332,173, and in the Union of South Africa June 22, 1928.

The present invention refers to electric power cable installations. The invention provides a system of cable junction boxes and fittings for use in connection therewith for connecting a number of lengths of cable, for taking off branch cables therefrom and for enabling portable electrically driven machines such as coal cutters to be plugged into the power line; the system being particularly suitable for use in gassy mines by reason of all the connections being mechanically strong and with current carrying members fully enclosed, and by reason also of the underground work necessary for making or unmaking connections being simplified and minimized.

The invention is illustrated in the accompanying drawing in which

Fig. I is a diagrammatic view of a typical mine power cable installation according to the invention.

Fig. II is a perspective view of a branched junction box fitted with cable couplings.

Fig. III shows a through junction box.

Fig. IV shows a cable end cap.

Fig. V a switch box attachment.

Fig. VI a box connection.

Referring to Fig. I, 2 indicates a main switch in the main cable line; which line is further constituted by junction boxes 3ª, 3ᵈ, 3ᵉ, 3ᶠ, standard lengths of cable 4.

The main line box indicated by 3ª is shown as providing for a branch circuit including a further series of boxes of which 3ᵇ has a connection for a coal cutter 5: said connection comprising a plug box 6, a short trailing cable 7, a gate end switch 8 and the trailing cable 9 connected directly to the coal cutter 5. Box 3ᶜ in this branch is shown as provided with a subsidiary cable 10 for a pump or the like 11.

At the right hand end of the system is shown a collection of junction boxes 3ᵈ forming a distribution point for a number of adjacent power units, and mechanically connected by box connectors 12. One of these boxes is shown as fitted with a plug box 6 and others with subsidiary cables 10.

Where the line traverses areas of the mine in which no work is being carried on, the junction boxes are arranged for straight through connection. 3ᵉ indicates a branch box adapted for such use by closing its branch openings by caps 38; but preferably a through box 3ᶠ is employed which has no branch openings.

The standard branched junction box 3ª is used wherever branches are taken off or are likely to be required. This form of box is shown in Fig. II and is conveniently a casting. It has an open top fitted with a detachable cover 13 preferably provided with a machined flange 14 for bolting it to the similar inward flange 15 of the box. The box has the opposite lateral openings 16 for sections of a through cable, and two (or more) further lateral openings 17 for branch connections.

All said openings are provided with means for securing a cable coupling to the box; preferably a machined flange face 18 having studs 19 for securing a similar flange of the coupling. For standardization purposes, the cable openings 16, 17 and the means for securing the cable couplings to them, also the box covers 13 and their fastenings are identical in all the junction boxes of the system.

A feature of the invention is a cable coupling which is completely secured mechanically to a cable and insulated from the leads thereof before it is secured to the box. A cable length can thus be completely prepared at the surface and when brought under ground requires only simple mechanical and electrical connection to junction boxes already erected.

Such a coupling is shown in section at the right hand of Fig. II. It comprises a casing 20 of conical form, having at its larger end the drilled flange 21 for bolting to any of the flanges 18 of the junction boxes.

The cable 4 or 10 enters the coupling at its smaller end. At this point the armouring 22 of the cable is opened out and a conical gun-metal plug 23 is placed over the lead sheathing 24 and beneath the opened-out armouring, expanding the latter into conical form similar to that of the interior of the casing. The plug 23 is split at one side as indicated at 25 or otherwise made somewhat contractible to grip the sheathing.

It is preferred to bind the armouring with wire 26; whereafter said wire 26, the loose ends of the armouring 22, and the interior of the casing 20 are tinned. A layer of molten lead is then poured into the casing forming a plug 27 which incorporates the loose and preferably hooked ends 28 of the armouring and also solders the armouring to the casing.

Insulation is provided at the larger end of the casing. This may consist of a cover plate 29 of insulating material screwed down to an inward flange 30 of the casing and having an aperture 31 through which the unsheathed cable leads 32 extend. This cover plate serves the additional purpose of supporting the leads 32 and preventing their being bent or moved at their point of emergence from the sheathing 24. The cover plate is formed with an aperture through which the space remaining in the casing is filled with insulating compound 29a. This aperture is closed by a screw plug 33 by which pressure can be applied to the compound to cause it to fill the space completely.

To complete the preparation of the cable the ends of the leads 32 are cut to the proper length, provided with terminals 34, and taped. Both ends of the cable being thus prepared, the cable is ready for connection to its junction boxes or other fittings.

The preparation of the cable ends would be done at the surface; and in order to protect them during transportation into the mine and while awaiting connection to the boxes, they are provided with protecting caps Fig. IV. Such a cap consists of a tube 35 closed at its end 36 and provided at its other end with a flange 37 similar to the flange 18 of the junction boxes. In use it is bolted to the flange 21 of the couplings.

A further fitting comprised in the system is a cap 38 for the box cable openings 16, 17. This has a flange 39 and stud holes similar to those of the cable coupling, so that one of said caps may be secured to and close any desired cable opening of a box. These caps are used for instance for closing any opening of an installed box which is not in use, as indicated by the numerals 38 in Fig. I. They are also used in conjunction with the cover 13 for sealing a box during the time it is being taken into the mine and erected.

The cable lengths having thus been prepared at the surface and transported underground, and the sealed boxes having been erected it is only necessary, in order to install the cables, to remove the box cover 13 and such box caps 38 as are no longer required, bolt the prepared couplings 20 in the place of the removed caps, connect the leads within the box and re-fix the cover 13.

In boxes used for connecting a main cable section to a branch cable or other lead, a terminal block 40 of insulating material is provided. This is secured to the base of the block by screws 41 so that it may be removed from a box in which it is not required (e. g. the box 3e Fig. I) and also replaced when necessary. It has usually three upstanding ribs 42 to separate the phases of a three phase system.

Between the ribs 42 are studs 43 secured to the block preferably by means of a foot 44 into which the stud is screwed and which is itself fixed to the base plate by screws 45. The main cable terminals 34 are passed in pairs over the lower end of each stud and are secured by the nuts 46. An insulating division plate 47 is then passed over the studs to rest on the ribs 42; and insulating bushes 48 are placed over the studs to fill the holes in the division plate. The branch lead terminals 34a are secured to the upper ends of their respective studs 43 by pairs of nuts 49; the division plate 47 separating the branch leads from the main leads where they cross.

In the case of a through or un-branched junction box, Fig. III, a terminal block is not necessary, since the main terminal 34 can be directly bolted together as indicated. This form of box may be otherwise similar to the branched box above described except that it has only the two opposite outlets 16.

Another unit of the system is the box connector 12 Fig. VI. This may be a casting, and comprises a tubular body having at each end bolting flanges 50 identical with the flanges 21 of the cable couplings. It is used as the connection between a pair of boxes which are positioned close to one another and takes the place of a pair of cable couplings and their cable. It is bolted between a pair of boxes (e. g. 3d Fig. I) and may mechanically support one from the other. A short length of cable 51 is passed through it and connected in the boxes similarly to the main cable.

A further unit of the system is a plugging-in box 6, having a bolting flange 52 identical with the flange 21 of the cable couplings, whereby it can be connected directly to any junction box in the same way as the cable couplings.

There is also provided a loose flange 53, Figs. I and V having a jointing face 18a and studs 19a similar to the face 18 and studs of the junction boxes, and having also other bolt holes 54. By means of the latter it can be bolted to a non-standard fitting such as the switch box 2, for the purpose of enabling the standard cable coupling to be attached to it in turn.

I claim:

1. The combination of an electric cable comprising sheathing and armouring, a cable coupling comprising a conical casing into the smaller end of which the cable is inserted and having means at its larger end for mechanically securing it to a junction box, the cable armouring within the coupling being expanded to conical form, a conical plug inserted between such expanded armouring and the cable sheathing within the coupling, a plug cast in the casing beyond the conical plug and incorporating the ends of the armouring, cable leads extending from the larger end of the casing and insulation for said leads contained in the casing.

2. The combination of an electric cable comprising sheathing and armouring, a cable coupling comprising a conical casing into the smaller end of which the cable is inserted and having means at its larger end for mechanically securing it to a junction box, the cable armouring within the coupling being expanded to conical form, a contractible conical plug contracted upon the sheathing and holding the armouring in conical form, further means to secure the armouring within the casing, cable leads extending from the larger end of the casing and insulation for said leads contained in said casing.

3. The combination of an electric cable comprising sheathing and armouring, a cable coupling comprising a conical casing into the smaller end of which the cable is inserted and having means at its larger end for securing it to a junction box, the cable armouring within the coupling being expanded to conical form, a conical solderable metal plug inserted between such expanded armouring and the cable sheathing within the coupling casing, and soldering metal cast in the casing to form a plug at the larger end of the conical plug incorporating the ends of the armouring and to solder together the cable sheathing, the armouring, the conical plug and the casing.

4. The combination with an electric cable coupling casing within which the cable is mechanically fixed, said casing being provided at its free end with a flange for bolting it to a junction box, and a cover closing the free end of the casing and provided with a flange, said flange being bolted to the flange of the casing.

In testimony whereof I affix my signature.

LEON BYRON WOODWORTH.